United States Patent [19]

Korinek

[11] Patent Number: 4,589,942

[45] Date of Patent: May 20, 1986

[54] METHOD FOR LAMINATING A COMPOSITE ASSEMBLY

[75] Inventor: Robin Korinek, Kansas City, Mo.

[73] Assignee: Transilwrap Company, Kansas City, Mo.

[21] Appl. No.: 629,714

[22] Filed: Jul. 11, 1984

[51] Int. Cl.⁴ ............................................. B32B 31/00
[52] U.S. Cl. ....................................... 156/148; 29/622;
100/38; 100/42; 100/176; 156/182; 156/276;
156/301; 156/309.9; 156/312; 156/322;
156/324; 156/324.4; 156/555
[58] Field of Search ................. 156/148, 322, 182, 324,
156/276, 555, 312, 301, 309.9, 324.4; 29/622;
100/38, 42, 176

[56] References Cited

U.S. PATENT DOCUMENTS 3,901,758  8/1975  Humphries .......................... 156/555
4,069,081  1/1978  Drower et al. ...................... 156/324

Primary Examiner—John J. Gallagher

Attorney, Agent, or Firm—Kinzer, Plyer, Dorn & McEachran

[57] ABSTRACT

A method for laminating a composite assembly having outer films of plastic to provide such a composite assembly without appreciable transverse curl. The method includes the steps of preparing two oppositely facing outer films which may be of bi-axially oriented plastic. Each film may have an outer layer of a tough abrasion resistant material and an inner layer of thermoplastic bonding resin. In one embodiment, a portion of the inner layer of thermoplastic bonding resin may be coated with a strip of electrically conductive material. The inner layers of thermoplastic bonding resins are heated and the films are brought together in a common plane. In one embodiment, a central core is inserted between the converging films at spaced intervals. The outer films and the central core are laminated by passing them between first and second pairs of pressure rolls. The first and second pairs of pressure rolls are tilted at equal and opposite angles to the plane of the films.

5 Claims, 5 Drawing Figures

U.S. Patent  May 20, 1986  4,589,942
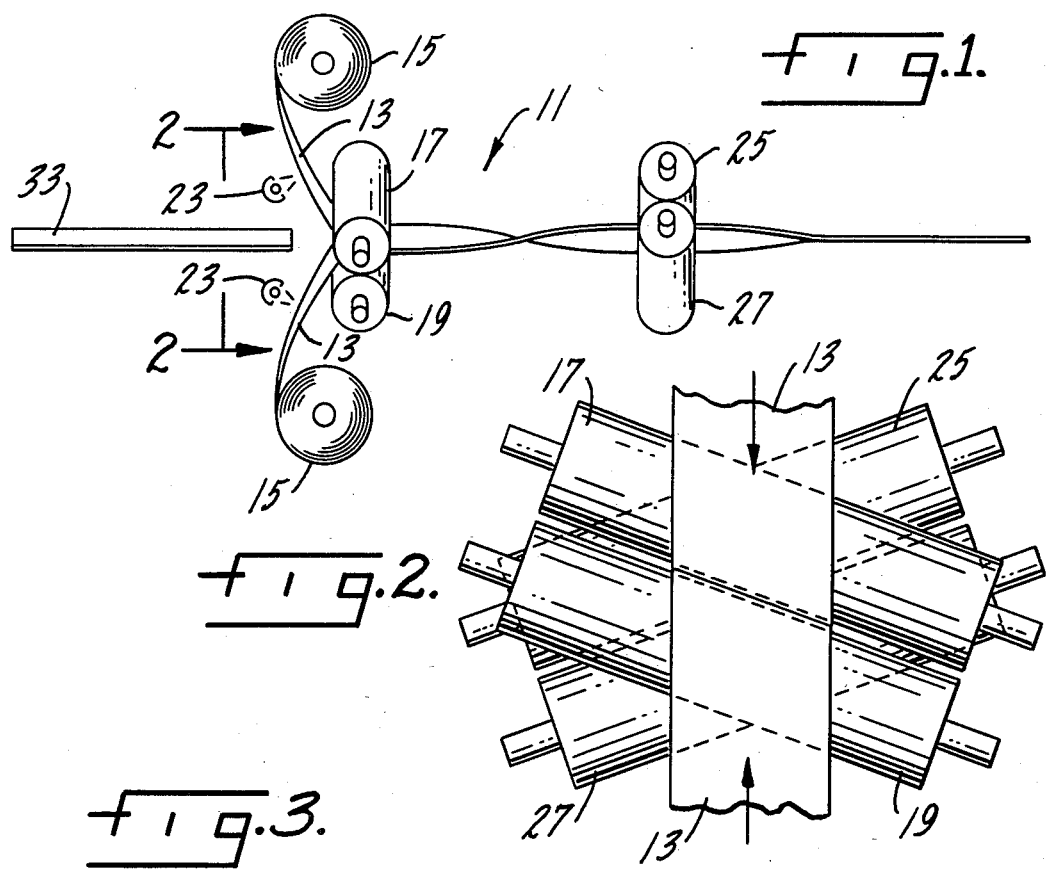
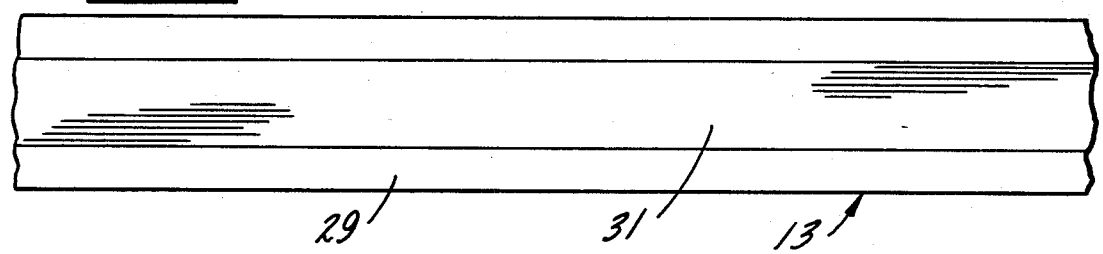
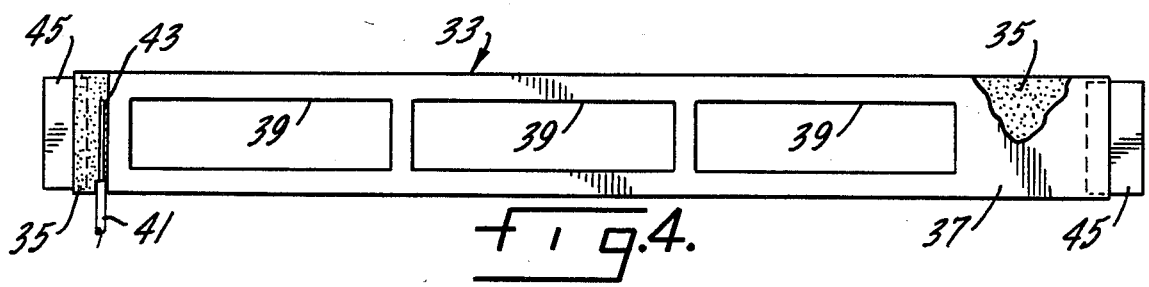
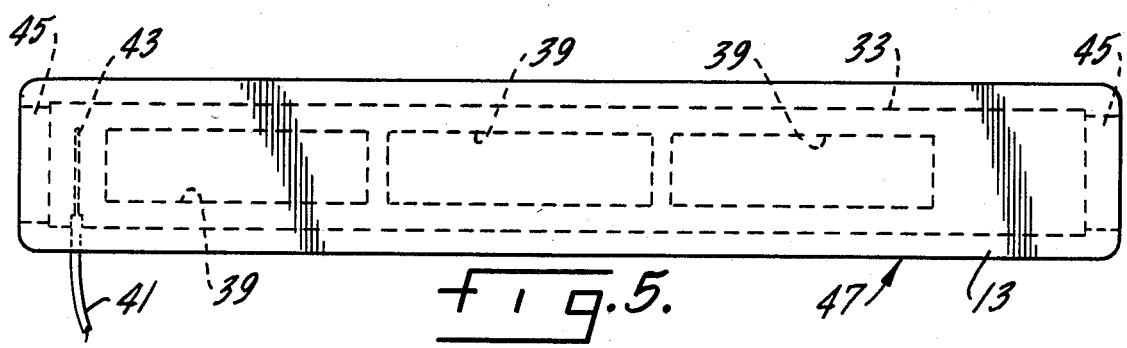

METHOD FOR LAMINATING A COMPOSITE ASSEMBLY

BACKGROUND OF THE INVENTION

There are many instances in which it is desirable to laminate outer films to each other, especially films that have outer protective layers of a tough abrasion resistant material and an inner layer of thermoplastic bonding resin.

One commonly used outer protective film is of composite construction having one surface formed of a tough abrasion resistant polyester resin, the opposite surface comprising a material that serves as an adhesive for bonding the film to another film or to another film and an interior core. The most common adhesive material used is polyethylene.

One prevalent problem in laminating a composite assembly having outer films of plastic such as the composite film just mentioned is transverse curling of the composite due to heating of the films which is required to activate the thermoplastic bonding resin. This problem is due to minor variations in the film thicknesses, differences in the heating of the two laminating films and other factors. The resulting curl in these laminated articles, which occurs in the transverse direction, is frequently quite objectionable.

Transverse curling also is a problem in the manufacture of composite articles of such films which also have a central core. The central core can be an article to be protected or it can be a resilient material that normally keeps the outer films apart, at least in selected areas, usually areas that are coated with an electrically conductive material so that the composite article when equipped with suitable wiring can function as an electrical switch.

SUMMARY OF THE INVENTION

It is a principal object of the present invention, therefore, to provide a new and improved method for laminating a composite assembly having outer films of plastic that effectively and inherently controls the curl of the resulting composite laminated article, to the point of complete elimination of all curl.

Another object of this invention is to provide a new and improved method for laminating a composite article having outer films of bi-axially oriented plastic and a central core of a high density plastic foam located between strips of conductive material formed on the inner surfaces of the outer films to permit the assembly to operate as an electrical switch.

Accordingly, the invention relates to a method of laminating a composite assembly having films of plastic to provide such a composite assembly without appreciable transverse curl, the method including the following steps:

(a) Preparing two oppositely facing films, each having an outer layer of a tough abrasion resistant material and an inner layer of a thermoplastic bonding resin;
(b) Heating the inner layers of thermoplastic bonding resin of the films;
(c) Bringing the films together in a common plane;
(d) Laminating the films by passing them between first and second pairs of pressure rolls;
(e) The first pair of pressure rolls being tilted at an angle relative to the common plane of the films; and
(f) The second set of pressure rolls being tilted relative to the common plane of the films at an equal angle in the opposite direction of the tilt of the first set of rolls.

BRIEF DESCRIPTION OF THE DRAWINGS

The invention is illustrated more or less diagrammatically in the following drawings wherein:

FIG. 1 schematically illustrates the principal components of the laminating process;

FIG. 2 is an enlarged partial view taken along line 2—2 of FIG. 1 with parts broken away and omitted for clarity of illustration;

FIG. 3 is a view of the inner surface of one of the outer films showing a strip of conductive material applied to the film;

FIG. 4 is a plan view of the assembled central core of the composite assembly; and FIG. 5 shows a view of a finished article made by the process of this invention.

DESCRIPTION OF THE PREFERRED EMBODIMENT

FIGS. 1 and 2 illustrate laminating apparatus 11 effectively usable to carry out the laminating method of this invention. The laminating apparatus 11 is shown in essentially schematic form because the individual components are well known in the art.

The laminating apparatus 11 of FIGS. 1 and 2 comprises two supplies 13 of laminating film, in this instance shown as reels 15, from which the individual films are fed into the nip between two pressure rolls 17 and 19. The driving and pressure adjusting mechanisms for the pressure rolls are not shown since they are conventional and well known in the art. Heaters 23, which may be of any conventional construction known to the art, are provided to heat the inner layers of the films 13 before they are brought together. These heaters are located as close to the nip between pressure rolls 17 and 19 as is physically possible.

A second pair of pressure rolls 25 and 27 are located downstream of the first pair of pressure rolls. These pressure rolls are the same size and construction as those of the first pair of rolls. Their driving and adjusting mechanisms are also conventional and for this reason are not shown.

The preferred form of the laminating film 13 is shown in FIG. 3 of U.S. Pat. No. 4,069,081 and consists of an outer layer formed of a tough abrasion resistant thermosetting polyester resin such as the resin polyethylene terephthalate available commercially under the trade name "Mylar". This film is bi-axially oriented. The inner bonding layer, comprising a coating on one surface of the laminating film 13, is preferably formed of polyethylene. In a typical laminating film 13, the polyester outer layer may have a thickness of 0.0005 inch and the bonding layer of polyethylene may have a thickness of 0.001 inch. Films of this composite construction are commercially available from a number of different suppliers in widely varying thicknesses for each of the layers.

The pressure rolls 17 and 19 are tilted relative to the plane in which the laminating films 13 come together ahead of the nip of the pressure rolls 17 and 19. In this example, the rolls 17 and 19 are tilted at an angle of approximately 20° relative to the plane of the laminating film 13. However, this angle can be varied depending upon the amount of tilt required to eliminate transverse curling of the films. Likewise, the second set of pressure rolls 35 and 37 are tilted at the same angle relative to the original plane of the laminating films 13 but in the opposite direction. This angle can be varied depending on the amount of tilt required to eliminate transverse curling of the laminating films 13.

The apparatus and method thus described can be used in the manufacture of many products in which it is desired to eliminate transverse curling. The films so laminated may or may not enclose another item. The item enclosed may be an item to be protected by the films, which item may also interact with the films or with materials applied to the films. For example, as is shown most clearly in FIG. 3 of the drawings, the polyethylene coated inner surface 29 of the film 13 has applied thereto a continuous center strip 31 of electrically conductive graphite coating. The provision of an electrically conductive coating is not necessary to the broad concept of the invention but has utility in the laminated electric switch assembly described hereinafter which exemplifies the best mode for carrying out the invention.

The item which is inserted between the films 13 in the embodiment of the invention which exemplifies the best mode is a central core 33 which interacts with the center strip 31 of electrically conductive graphite which is applied to the inner surfaces 29 of each of the films 13. The central core 33 which is inserted between the laminating films 13 prior to the nip of pressure rolls 17 and 19 is shown in detail in FIGS. 4 and 5 of the drawings. The core is made of a piece of high density polyethylene foam 35 covered on opposite sides by a layer of silicone coated release paper 37. The release paper 37 provides additional strength to prevent undue elongation of the foam during lamination. Rectangular sections 39 of the core are cut out with the cutouts having widths approximately equal to the width of the graphite coating 31 on each of the laminating films 13. An electrical wire 41 having conductors 43 is attached to one end of the core where the releae paper 37 has been removed so that the conductors will be engaged by the graphite coatings 27 on the laminating films 13. Insulating spacers 45 are installed to extend out of the ends of the central core 33 to prevent unwanted short circuiting between the graphite coating 31 on one laminating film 13 and the similar coating on the other laminating film 13.

In the laminating process of this invention as applied to a laminated construction having a central core, the central core 33 is inserted at the nip between the pressure rolls 17 and 19 so that it is heat sealed between the laminating films 13. The core 33 in this embodiment is narrower than the widths of the films 13 and when it is centered relative to the strips 31 of the graphite coating, sufficient polyethylene coating 29 is provided beyond the edges of the core to seal one film 13 to the other, thereby completely enclosing the central core and creating a composite assembly 47.

FIG. 5 of the drawings shows the composite assembly 47 after laminating and cutting to separate the composite assemblies into individual units which, in this case, can function as electrical switches.

I claim:

1. A method for laminating a composite assembly having films of plastic to provide such a composite assembly without appreciable transverse curl, the method including the steps of:
    preparing two oppositely facing films, each having an outer layer of a tough abrasion resistant material and an inner layer of thermoplastic bonding resin,
    heating the inner layers of thermoplastic bonding resins of the films, bringing the films together in a common plane,
    laminating the films by passing them between first and second pairs of pressure rolls,
    the first set of pressure rolls being tilted at an angle relative to the common plane of the films, and
    the second set of pressure rolls being tilted relative to the common plane of the films an equal amount in the opposite direction of tilt of the first set of rolls.
2. The method of claim 1 including the step of:
    inserting at spaced intervals, central cores between the converging films to laminate the cores and the films.
3. The method of claim 1 in which the films are of bi-axially oriented plastic.
4. The laminating method of claim 2 in which each central core is an elongated piece of high density plastic foam which is narrower than the outer films.
5. The laminating method of claim 2 in which a portion of the inner layer of each outer film is coated with a graphite electrically conductive strip before lamination.

* * * * *